United States Patent [19]

Givens et al.

[11] Patent Number: 4,869,910

[45] Date of Patent: Sep. 26, 1989

[54] METHOD OF CONDITIONING OIL SEEDS AND SIMILAR MATERIALS

[75] Inventors: Joe C. Givens, Minneapolis; William L. Stevenson, Roseville; Darcy Moses, Rush; William L. Kratochwill, Minneapolis; George E. Anderson, Champlin, all of Minn.

[73] Assignee: Crown Iron Works Company, Minneapolis, Minn.

[21] Appl. No.: 185,090

[22] Filed: Apr. 22, 1988

[51] Int. Cl.⁴ ................................................ A23L 1/20

[52] U.S. Cl. .................................... 426/467; 426/482; 426/520

[58] Field of Search ............... 426/482, 483, 511, 520, 426/467

[56] References Cited

U.S. PATENT DOCUMENTS 3,220,451 11/1965 Bollens et al. .................... 426/482

4,556,573 12/1985 Bartesch et al. .................... 426/482

FOREIGN PATENT DOCUMENTS 58-71858 4/1983 Japan .................................. 426/482

*Primary Examiner*—George Yeung

*Attorney, Agent, or Firm*—Lawrence M. Nawrocki

[57] ABSTRACT

A method of conditioning an oil seed for removal of the hull therefrom for subsequent processing of the meat portion of the oil seed. The method includes a step of passing the oil seed, under the influence of gravity, downwardly through a plenum (26) of an oil seed conditioner (18). A gas is introduced into the conditioner (18), proximate a lower end thereof, through an inlet (32). The gas passes upwardly in a counter-current relationship to the downwardly passing oil seed. A plurality of staves (24) are disposed within the plenum (26) and extend thereacross. Consequently, as the oil seed passes downwardly through the plenum (26) it engages and bounces off the staves (24). Downward movement of the oil seed is retarded by the upward flow of the gas and the staves (24). The impacting of the oil seed against the staves (24) effects loosening of the hulls, and the extended period of time the oil seed is maintained within the plenum (26) facilitates crisping of those hulls.

9 Claims, 1 Drawing Sheet

METHOD OF CONDITIONING OIL SEEDS AND SIMILAR MATERIALS

TECHNICAL FIELD

The present invention deals broadly with the field of treating and conditioning materials such as oil seeds. Such products are typically processed to separate the meats, or center portion, from the hulls, or encasing portions. The present invention, more narrowly, deals with conditioning oil seeds, such as soybeans, for such processing. The preferred embodiment of the method deals with the application of heat to such materials to loosen and crisp the hulls.

BACKGROUND OF THE INVENTION

The processing of various oil seeds, typically, involves the separation of the hull, or outer encasement, from the meat so that the meat can be further utilized. For example, in the case of soybeans, it is generally desirable to separate the meat from the hulls prior to recovering oil from the meat.

With soybeans, evolution and improvement in methods employed for separation of the hulls from the meats is ongoing. Strong interest in effecting such improvements has arisen in recent years because of the necessity of reducing costs in the soybean processing industry. These costs include, among others, the cost of investment, labor, energy, and manufacturing overhead.

The various prior art attempts to improve conditioning processes, while bettering earlier processes, fall short of solving all of the problems existent in this technology. Certainly, apparatus which would enable effective economic processing of an oil seed such as soybeans and yet involve few steps would be a significant advance. For example, a process which would obviate the need for predrying and tempering of the oil seeds would go far to reduce the cost of processing.

Various solutions of the prior art accomplish some of these desired goals. None, however, accomplishes each and every goal and provides each desirable feature dictated by the prior art. For example, one proposed solution eliminates the predrying and tempering steps, but involves excessive investment cost and use of electric power. In addition, it requires separate systems for conditioning and hull removal.

Another proposed solution is intended to improve the quality of oil recovered when conditioning and dehulling is accomplished in accordance with the process. The proposed solution, however, produces meal of lower quality than would be desired due to the excessive moisture, temperature, and time used. Further, this solution uses more energy and requires more costly equipment.

It is to these problems and desirable features dictated by the prior art that the present invention is directed. It is an apparatus which improves over all known devices, and methods employing those devices, as known in the prior art.

SUMMARY OF THE INVENTION

The present invention is a method for conditioning oil seeds such as soybeans. Such products, in their natural state, include a meat portion encased by a hull. The present method invention functions to condition oil seeds so that the hulls can be removed to render the meat portions available for subsequent processing. The raw oil seed is passed through a closed plenum for movement in a first direction. A gas flow is induced through the plenum in a direction generally along the axis along which the raw oil seed generally moves. The rate of speed at which the oil seed passes through the plenum is controlled, and the duration of time over which the oil seed is exposed to the gas flow is, thereby, also controlled.

One way in which the method is practiced envisions causing the gas flow to pass through the closed plenum substantially in the opposite direction of that in which the raw oil seed moves. A counter-current flow is, thereby, established. The gas flow, if counter-current, can retard the rate of speed at which the oil seed passes through the plenum. It follows, therefore, that, by controlling the rate of gas flow, the period of time during which the oil seed is exposed to the gas flow can be regulated.

Typically, the process would be practiced to effect conditioning of the oil seed, to establish proper temperature and moisture for flaking, and to effect a separation of the hulls from the meats. It is envisioned that the gas employed for such a purpose would be a mixture of air and steam in any proportion. It has been found that a gas temperature of between 215° F. and 420° F. is suitable for this purpose.

Further loosening of the hulls can be accomplished by providing a multiplicity of staves extending across the plenum. As the oil seed passes through the plenum, at a rate controlled in part by the flow rate of the gas, the oil seed strikes and bounces off the staves and passes downwardly, typically, under the influence of gravity. The impact against the staves also serves to increase the time necessary for particles to pass through the plenum, thereby increasing the time for the conditioning process to occur.

The disposition of staves also serves to promote uniform distribution of the granular solid particles across the flow area as they traverse the column length and uniform distribution of the gas in contact with the particles. The staves, therefore, act to promote efficient contact of the particles with the gas, adding to the efficiency of the process and uniformity of the product. Other means of obtaining sufficient time and adequate distribution to promote proper conditioning, such as a column with increased length or an arrangement of baffles, can be used. The use of staves is only a preferred embodiment.

The preferred manner of practicing the invention envisions that, prior to introducing the oil seed into the plenum, it is processed to reduce the size of particles thereof. It has been found that the conditioning in order to loosen and crisp the hulls can be more effectively accomplished when this size reducing process is employed. A roller mill or cracking mill can be employed to accomplish this particle reduction.

Further, the preferred manner of practicing the process envisions the performance of a step wherein the partially conditioned oil seed leaving the first plenum would be subjected to further physical treatment, as by impacting the seeds against a surface, to effect additional loosening of hulls. After this step is performed, the oil seed particles may be introduced into a second plenum which is constructed similarly to the first plenum. Dehulling is effectively accomplished by practicing such a process.

If gas flow counter-current to the direction of flow of the oil seeds through the plenum is provided, the gas can carry off hull particles in one direction through the plenum. Typically, this would be upwardly within the plenum. Concurrently, the meats would pass downwardly under the influence of gravity, for recovery at the bottom of the plenum. Such separation can be effected in both plenums.

The present invention is thus, an improved method for conditioning oil seeds, such as soybeans, prior to subsequent processing. The method is improved in numerous respects over methods known in the prior art. The specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figures 1, 2:
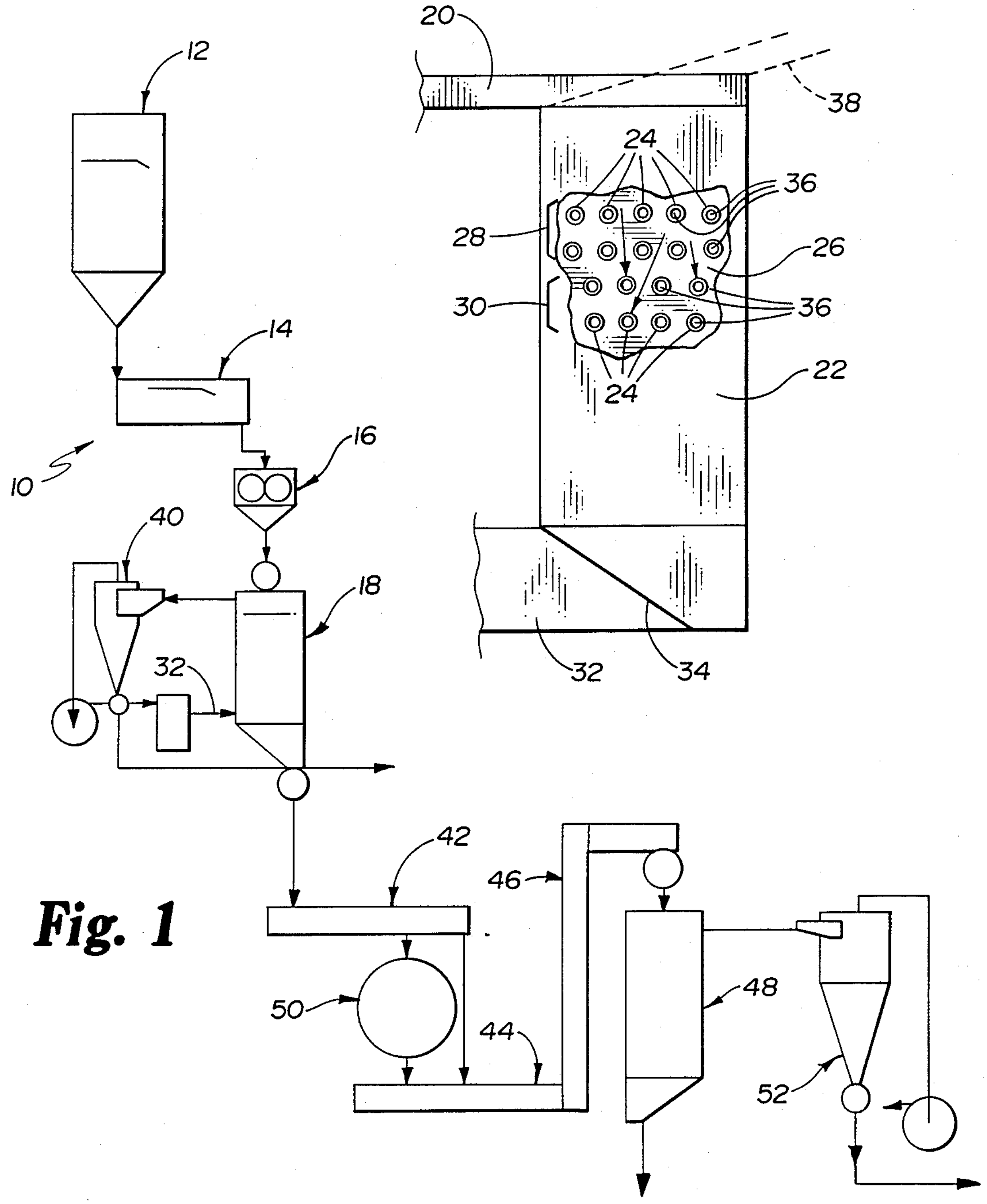
FIG. 1 is a schematic portrayal of various components employed to accomplish the process of the present invention.
FIG. 2 is a schematic portrayal of a conditioning device employed in the process.

Referring now to the drawing, wherein like reference numerals denote like elements throughout the several views, FIG. 1 illustrates the various components of a system 10 with which the present process invention can be practiced. The figure illustrates a work bin 12 in which an oil seed such as soybeans is stored for dispensing. Raw soybeans stored in the bin 12 are dispensed into a cleaner 14, if appropriate. The beans are cleaned at this point in the practicing of the method, prior to further processing being accomplished.

Beans, after leaving the cleaner 14, if desired, can be passed through a rolling mill or cracking mill 16. If this step is practiced, it is the first step in the actual dehulling process. It has been found that breaking the beans into smaller particles facilitates subsequent conditioning to dehull that occurs in later stages.

After cracking of the beans, the raw unconditioned beans are deposited into a conditioner 18. A feed screw 20 can be employed in actual practice for transferring the beans into the conditioner 18. It will be understood that the beans can be introduced at any upwardly disposed location on the conditioner 18. That is, they can be deposited in the top or at a point along the side partially down the side wall 22.

FIG. 2 shows the internal construction of a conditioner implement with which the present method would be practiced. A multiplicity of staves 24 extend generally transversely across the path the oil seed would traverse as it passes through plenum 26 defined within the conditioner 18. The staves 24 are distributed at locations so that the beans, as they pass through the plenum 26, will tend to strike the staves 24 numerous times. As they do, the hulls will be loosened from the meats to some extent. Furthermore, the impacts will increase the time for particles to pass through the plenum and improved distribution of the solids and gas across the full plenum cross-section.

A preferred distribution of the staves 24 envisions two identical rows of equally spaced staves 24, as at 28, alternated with two identical, off-set identical rows of staves 24, as at 30, wherein the diameters of the staves 24 are such that a bean falling directly downwardly from one row of staves 24 will, necessarily strike one of the staves 24 in the adjacent, off-set row. As will be able to be seen then, in view of this disclosure, beans passing downwardly through the conditioner plenum 26 will strike numerous staves 24 during the traverse.

A gas inlet 32 is provided proximate the bottom of the plenum 26. A perforated, obliquely disposed plate 34 can be incorporated to define the floor of the plenum 26. Gas entering the plenum 26 through a gas inlet 32 can, thereby, pass through the perforations, and rise upwardly through the plenum 26. As can be seen, this passage of the gas is in a counter-current direction to the general direction along which the oil seed moves downwardly under the influence of gravity.

It is envisioned that the gas introduced into the bottom of the plenum 26 would be heated to a high temperature. The preferred manner of practicing the method would employ a mixture of air and steam in any proportion as the gas. Such mixture, it is presently anticipated, would be heated to a temperature of between 215° F. and 420° F.

Passage of an air/steam mixture at such a temperature in counter-current flow to the downwardly falling oil seeds, in combination with the impacting of the oil seed with the staves 24, tends to both loosen the hulls from the oil seed meats and crisp those hulls during the time that the oil seed passes through the plenum 26. Optimum functioning of the conditioner 18, of course, depends upon the length of time to which the oil seed is subjected to treatment by the gas stream.

Downward movement of the raw oil seed can be retarded by impact with a suitable number and disposition of staves and by controlling the flow rate of the gas into the plenum 26. It has been found that, by increasing the gas flow rate to a desired level, the oil seed can be maintained in its downward traverse of the plenum 26 for a period of as long as 20 seconds. Such a length of time has been found to be sufficient to accomplish desired results. It will be understood, however, that gas flow velocity will be increased or decreased to adjust the contact period of the oil seed with the conditioning gas.

As seen in FIG. 2, the staves 24 can take the form of ducts which have internal passages 36 through which a gas flow can be passed. Again, steam can function well as the gas passed through the ducts 24. By constructing the staves 24 as described, additional heat can be brought to bear upon the oil seed as it passes through the plenum 26.

During the passage of the oil seed through the plenum 26 of the conditioner 18, a portion of the hulls will be separated from the meats of the soybeans or other oil seed. The meats, of course, have a greater terminal velocity than do the hulls, and the velocity of the gas flow would, typically, be maintained at a level less than the terminal velocity of the meats in order to maintain counter-current flow. It will be understood, however, that it might be desired, in certain circumstances, to have the processed material pass in the same direction as does the gas flow.

The relative velocity of the gas to the oil seeds, while normally being maintained at a level lower than the terminal velocity of the meats, may be maintained above the terminal velocity of the hulls. The hulls would, therefore, pass upwardly with the gas flow. Passage could be into a conduit 38, shown in phantom line in FIG. 2, for transmittal to a separator such as a cyclone separator 40.

In the cyclone separator 40, the fines and hull particles carried off by the gas could be removed therefrom as the first step in renewing of the gas. The fines and hull particles would be passed for further processing, if desired. The gas could be "scrubbed" or processed in other manners so that it could again be used for introduction into the bottom portion of the plenum 26 of the conditioner 18.

The partially conditioned meats passing out of the first conditioner 18 would, typically, pass onto a conveyor 42. The conveyor 42 would, in turn, transmit those materials, via a second conveyor 44 and an elevator 46, for reintroduction into a second conditioner 48. The second conditioner 48, it is envisioned, would be structured substantially the same as would be the first conditioner 18.

An interim step could, however, be performed upon the partially conditioned oil seed between processing in the two conditioner mechanisms 18, 48. An impacting or rolling device 50 can be inserted into the system between the conditioners 18, 48 for further impacting or size reduction of the beans. Such an additional step may facilitate removal of any hulls still adhering to the bean meats.

As previously discussed, the partially-conditioned oil seed is, if necessary, processed by a second conditioner 48. Because of the application of the conditioning process a second time, an extremely high percentage of the hulls can be removed.

The fines and hull particles passing out of the second conditioner 48 along with the gas would be separated from the gas by a separator. Again, a cyclone separator 52 functions well in this role. The fines and hull particles recovered could be transferred to the same receptacle (not shown) as were the fines and hull particles from the first conditioner 18 processing.

The gas from the separator 52 could be recovered. Alternatively, some or all of the gas may be exhausted and the system replenished with fresh gas. Heat recovery apparatus may be employed. Processing could be performed upon the gas to renew it so that it also could be used again.

The oil seed meats leaving the second conditioner 48 would be substantially in a condition for subsequent processing in a manner known in the art. They could, therefore, be transferred to a flaker or other processing implement (not shown).

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method of conditioning an oil seed, which, in its natural state, includes a meat portion encased by a hull, for removal of the hull and subsequent processing of the meat portion, comprising the steps of:

(a) passing raw oil seed through a first gas treatment plenum, under the influence of gravity, downwardly through the first plenum;

(b) causing a gas to concurrently flow upwardly through the first plenum generally counter-current to the passage of the oil seed, the gas flow contacting the raw oil seed as it passes the oil seed in its counter-current flow;

(c) heating the gas flow prior to passing it through the first plenum; and (d) retarding the rate of speed at which the oil seed passes through the first plenum and, thereby, increasing the duration of time over which the oil seed is exposed to the gas flow by providing a multiplicity of staves extending across the first plenum, wherein the oil seed engages and bounces off the staves as it passes downwardly through the first plenum, and wherein hulls of the oil seed are loosened and crisped as the oil seed passes downwardly through the first plenum.

2. A method in accordance with claim 1 wherein retarding the rate of speed at which the oil seed passes through the plenum is further effected by regulating the rate of flow of the gas through the plenum.

3. A method in accordance with claim 1 wherein the gas passed into the plenum is a mixture of air and water vapor in any proportion at a temperature of between 215° F. and 420° F.

4. A method in accordance with claim 1 comprising the further step of passing the oil seed, after it exits the first plenum, through a second plenum, constructed similarly to the first plenum.

5. A method in accordance with claim 4 comprising the further step of impacting the oil seed, after it has exited the first plenum, prior to passing it through the second plenum.

6. A method in accordance with claim 1 comprising the further step of reducing the size of oil seed particles prior to passing the oil seed through the first plenum.

7. A method in accordance with claim 1 wherein the gas is a mixture of air and steam in any proportion.

8. A method in accordance with claim 7 wherein, as the oil seed passes through the plenum in a counter-current relationship to the gas flow, fragments of hulls are separated from the oil seed meats.

9. A method in accordance with claim 8 comprising the further step of removing hull particles, separated from meat portions of the oil seed as a result of the oil seed engaging and bouncing off the staves, and entrained in the gas flow, from one end of the plenum and the meats from an opposite end.

* * * * *